United States Patent
Xing et al.

(10) Patent No.: US 12,077,965 B2
(45) Date of Patent: *Sep. 3, 2024

(54) COLORED ROOFING MEMBRANE WITH IMPROVED SOLAR REFLECTANCE

(71) Applicant: BMIC LLC, Dallas, TX (US)

(72) Inventors: Linlin Xing, Wayne, NJ (US); Thomas John Taylor, West Nyack, NY (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/820,936

(22) Filed: Aug. 19, 2022

(65) Prior Publication Data

US 2023/0082488 A1    Mar. 16, 2023

Related U.S. Application Data

(63) Continuation of application No. 16/601,151, filed on Oct. 14, 2019, now Pat. No. 11,421,419, which is a continuation of application No. 14/213,299, filed on Mar. 14, 2014, now Pat. No. 10,480,192.

(60) Provisional application No. 61/793,758, filed on Mar. 15, 2013.

(51) Int. Cl.
  *E04D 5/10*    (2006.01)
  *E04D 5/06*    (2006.01)

(52) U.S. Cl.
  CPC .................. *E04D 5/10* (2013.01); *E04D 5/06* (2013.01); *Y02A 30/254* (2018.01); *Y02B 80/00* (2013.01); *Y10T 156/10* (2015.01); *Y10T 428/31913* (2015.04); *Y10T 442/10* (2015.04)

(58) Field of Classification Search
  CPC ........... E04D 5/10; E04D 5/06; Y02A 30/254; Y02B 80/00; Y10T 156/10; Y10T 428/31913; Y10T 442/10
  See application file for complete search history.

(56) References Cited

U.S. PATENT DOCUMENTS

| | | |
|---|---|---|
| 4,948,655 A | 8/1990 | Danese |
| 2004/0127872 A1 | 7/2004 | Petryk et al. |
| 2004/0148887 A1 | 8/2004 | Di Pede |
| 2004/0204547 A1* | 10/2004 | Dharmarajan ...... C08L 23/0815 525/240 |
| 2005/0053743 A1 | 3/2005 | Bartek |
| 2005/0053745 A1 | 3/2005 | Bartek et al. |
| 2005/0053746 A1 | 3/2005 | Bartek |

(Continued)

FOREIGN PATENT DOCUMENTS

| | | |
|---|---|---|
| WO | 2008030267 | 3/2008 |
| WO | 2012021489 | 2/2012 |

OTHER PUBLICATIONS

Ronnen Levinson, Pigment Talk, "Cool Colors for Summaer", Apr. 22, 2004, p. 1-43.

*Primary Examiner* — Elizabeth M Imani
(74) *Attorney, Agent, or Firm* — GREENBERG TRAURIG, LLP

(57) ABSTRACT

Exemplary embodiments of a thermoplastic polyolefin membrane are provided. The colored TPO membrane can have a cap layer having a top color layer and a white sub-layer having a solar reflectance underneath the top color layer, and a core layer underneath the cap layer. The colored TPO roofing membrane can have a reinforcing polyester scrim between the cap layer and the core layer. The white sub-layer can be made up of one or more layers.

20 Claims, 3 Drawing Sheets

(56) References Cited

U.S. PATENT DOCUMENTS

| | | |
|---|---|---|
| 2007/0194482 A1 | 8/2007 | Douglas et al. |
| 2008/0008857 A1 | 1/2008 | Kalkanoglu et al. |
| 2009/0064628 A1 | 3/2009 | Mellott, II et al. |
| 2012/0244340 A1 | 9/2012 | Peng et al. |

* cited by examiner

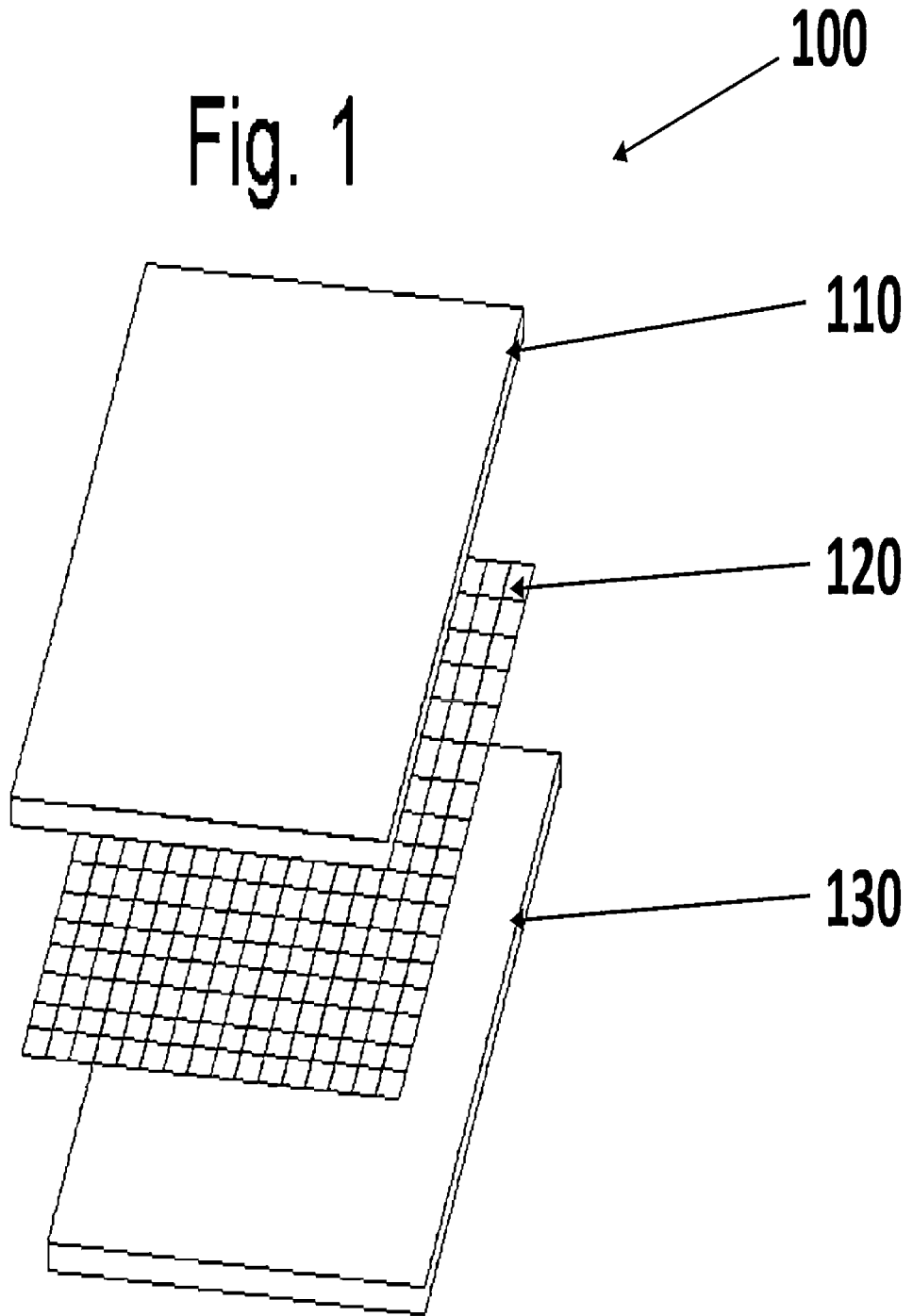

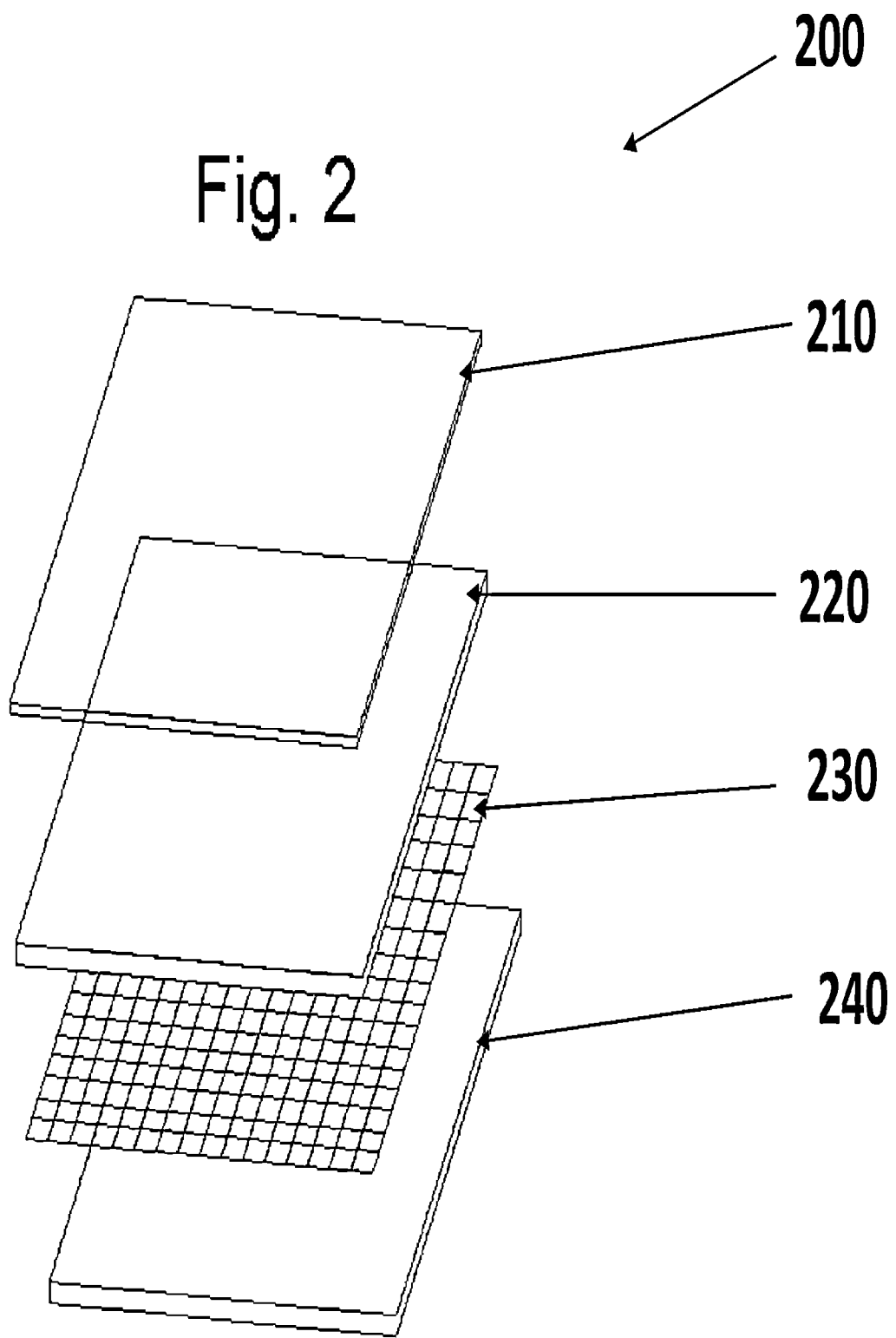

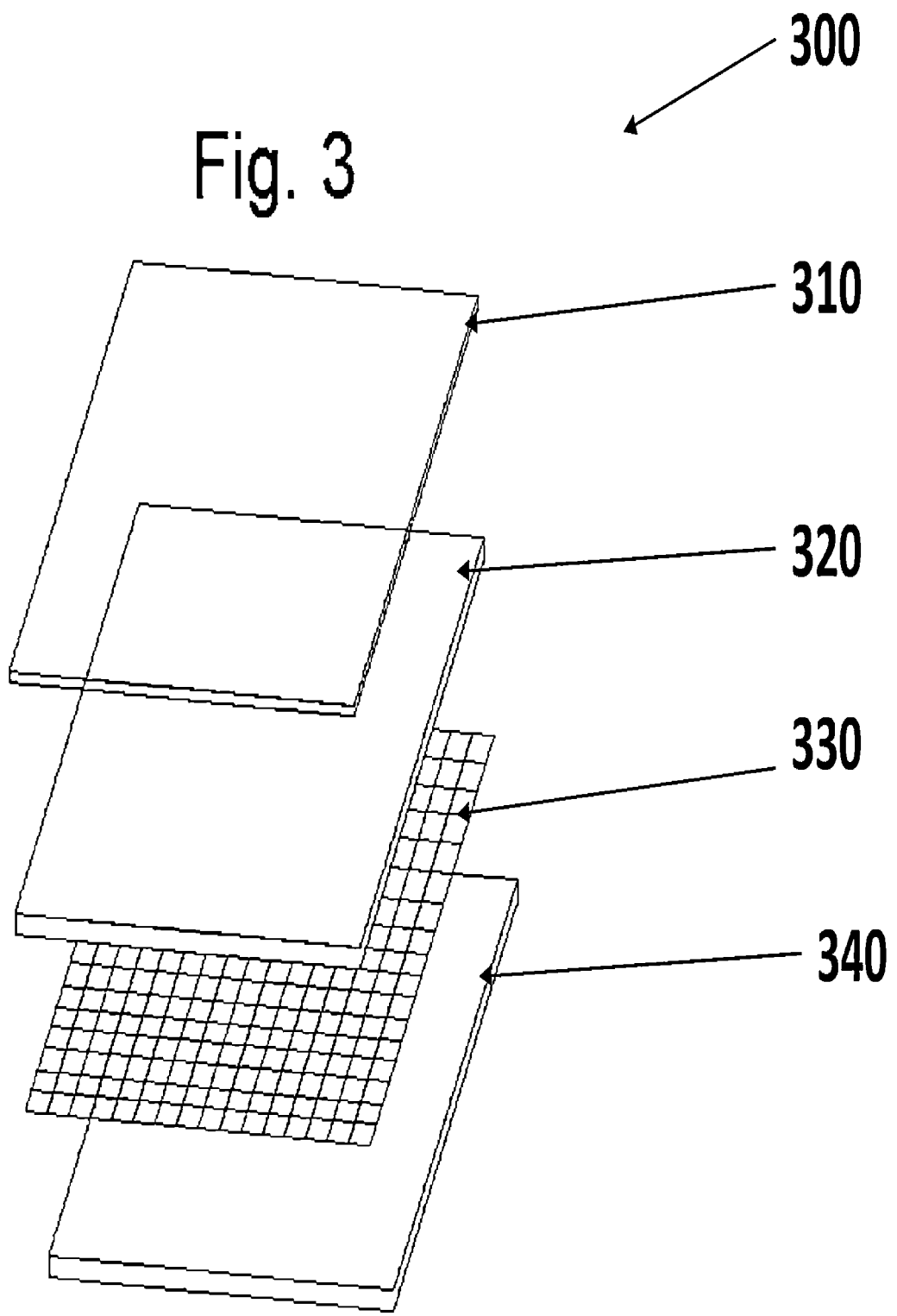

COLORED ROOFING MEMBRANE WITH IMPROVED SOLAR REFLECTANCE

CROSS-REFERENCE TO RELATED APPLICATION(S)

This application is a continuation of Ser. No. 16/601,141, filed Oct. 14, 2019, now U.S. Pat. No. 11,421,419, which is a continuation U.S. patent application Ser. No. 14/213,299, filed on Mar. 14, 2014, now U.S. Pat. No. 10,480,192 which claims priority to U.S. Provisional Application Ser. No. 61/793,758, filed Mar. 15, 2013, the entire disclosures of which are herein incorporated by reference in their entirety.

FIELD OF THE DISCLOSURE

The present disclosure relates to exemplary embodiments of a thermoplastic polyolefin roofing membrane, and more particularly, to exemplary embodiments of a thermoplastic polyolefin roofing membrane with an improved solar reflectance.

BACKGROUND INFORMATION

Conventional thermoplastic polyolefin ("TPO") based roofing membranes can be made up of three layers. As shown in FIG. 1, a typical TPO based roofing membrane 100 can have an upper layer 110 that is generally a TPO sheet, sometimes referred to as a "cap layer", which can be formulated with ultraviolet absorbers and stabilizers, thermal stabilizers, pigments, fire retardants and the like. Typically, the upper layer 110 can be formulated to provide for long term stability in an outdoor environment. The bottom layer 130 of a TPO roofing membrane can also be a TPO sheet, sometimes referred to as a "core layer", and generally can contain fewer or lower concentrations of stabilizers.

The central layer 120 of a TPO roofing membrane can typically be a fabric scrim that acts as a reinforcement to improve the physical performance of the roofing membrane 100. The fabric scrim 120 can contribute significantly to the tensile strength of the roofing membrane 100 and provide for dimensional stability. Typically, the fabric reinforcement can be a polyester based scrim. Glass based scrims can also be used where additional weight or improved dimensional stability may be required.

The three layers can be laminated together at elevated temperatures such that the upper layer 110 and bottom layer 130 can be joined or fused together through the interstices of the scrim of the middle layer 120.

Roofing membranes can provide more benefits than just protection from the weather. In addition to aesthetic aspects of residential roofing material design, both residential and commercial roofing can now provide advantages to the energy usage of buildings and homes. By providing roofing membranes with higher reflectance, it can be possible to lower the heat gain experienced by a building. Such reflective systems are referred to as "cool roofs" and provide for lowered cooling demand for building interiors.

TPO roofing membranes are mostly used on low slope roofs that can have pitches of less than approximately two inches vertical rise over an approximately twelve inch horizontal distance. One advantage of TPO membranes compared to traditional asphaltic systems can be their high total solar reflectance ("TSR"), which can be achieved through various means including the incorporation of titanium dioxide.

The TSR can indicate how much of the sun's ultraviolet, visible and infrared energy (i.e., solar flux) is reflected. TSR can be defined as the fraction of solar flux reflected by a surface expressed as a percent or within the range of 0.00 and 1.00. Measurement can be done using the methods described by the American Society for Testing and Materials ("ASTM") Standard E903, ASTM C1549 or ASTM E1918. ASTM E903 measures TSR over the wavelength range 250 nm to 2500 nm using integrating spheres. By using a commercial portable solar reflectometer that can be calibrated using specimens of known TSR, ASTM C1549 can determine TSR from measurements at four wavelengths in the solar spectrum: 380 nm, 500 nm, 650 nm and 1220 nm. ASTM C1549 shows the comparison results between the C1549 and E903 methods. The solar reflectance results at air mass 1.5 measured per ASTM C1549 are generally 1.9% greater than those obtained with SSTM E903. ASTM discontinued E903 in August 2005 in accordance with section 10.5.3.1 of the Regulations Governing ASTM Technical Committees, which requires that standards shall be updated by the end of the $8^{th}$ year since the last approval date. ASTM E1918 covers the TSR measurement for various horizontal and low sloped surfaces and materials in the field, using a pyranometer. This test method can be used when the sun angle to the normal from a surface is less than 45 degrees. For commercially available white or very light color TPO membrane, TSR is typically 0.70 or higher.

Roofs that can be seen from the ground and roofs that are overlooked by taller buildings are generally unattractive when white and highly reflective. Therefore, manufacturers have begun to use color pigments for those TPO roofing membranes that will be viewed, or that are required to have aesthetic value. However, such colored membranes have significantly degraded TSR values, compared to white, depending on the darkness of the pigment used.

Some TPO roofing membranes have a "cool color" pigment technology that reflects more infrared radiation than would be expected for a given color. However, these roofing membranes provide only a marginal improvement over standard colored TPO roofing membranes.

The cap layer, or upper layer, of a roofing membrane represents a very significant portion of the cost of a roofing membrane. Further, in hot climates, the solar reflectance of colored TPO membranes can affect the heat gain experienced by a commercial or residential building. Also, the long term weathering performance and color fastness of the cap layer of colored TPO roofing membranes are critical for long term waterproofing and for aesthetic appearance.

BRIEF DESCRIPTION OF THE DRAWINGS

The foregoing and other exemplary objects of the present disclosure will be apparent upon consideration of the following detailed description, taken in conjunction with the accompanying exemplary drawings and claims, in which like reference characters refer to like parts throughout, and in which:

FIG. 1 is an illustration of a conventional thermoplastic polyolefin based roofing membrane;

FIG. 2 is an illustration of an exemplary embodiment of a thermoplastic polyolefin roofing membrane according to the present disclosure; and FIG. 3 is an illustration of another exemplary embodiment of a thermoplastic polyolefin roofing membrane according to the present disclosure.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject disclosure.

SUMMARY OF EXEMPLARY EMBODIMENTS OF THE DISCLOSURE

At least some of the above described problems can be addressed by exemplary embodiments of the colored thermoplastic polyolefin roofing membrane having an enhanced solar reflectance according to the present disclosure.

In some exemplary embodiments of the present disclosure, a thermoplastic polyolefin membrane is provided, comprising a cap layer comprising a top color layer, and a white sub-layer having a solar reflectance underneath the top color layer, and a core layer underneath the cap layer. The thermoplastic polyolefin membrane can further comprise a fabric scrim between the cap layer and the core layer. The fabric scrim can be a reinforcing polyester scrim.

The top color layer can comprise one or more of cool color pigments, UV stabilizers, and fire retardants. The white sub-layer can comprise one or more of titanium dioxide pigment, UV stabilizer package, fire retardant and TPO resins. The white sub-layer can comprise one or more layers. The core layer can comprise a dark color, and can comprise carbon black, titanium dioxide, UV stabilizer packages, fire retardant and TPO resins. The core layer can comprise a light color, and can comprise titanium dioxide, UV stabilizer packages, fire retardant and TPO resins.

In some exemplary embodiments of the present disclosure, a method of manufacturing a thermoplastic polyolefin membrane can be provided, the method comprising providing a cap layer comprising providing a top color layer, and providing a white sub-layer having a solar reflectance underneath the top color layer, and providing a core layer underneath the cap layer. The method can further comprise providing a fabric scrim provided between the cap layer and the core layer. The fabric scrim can be a reinforcing polyester scrim.

These and other objects, features and advantages of the present disclosure will become apparent upon reading the following detailed description of embodiments of the present disclosure, when taken in conjunction with the appended claims.

DETAILED DESCRIPTION OF EXEMPLARY EMBODIMENTS OF DISCLOSURE

Exemplary embodiments of the colored thermoplastic polyolefin roofing membrane with an improved solar reflectance according to the present disclosure will be described below.

FIG. 2 is an illustration of an exemplary embodiment of a thermoplastic polyolefin roofing membrane 200 according to the present disclosure. A cap layer (i.e., a top layer) can be provided having a thin top color layer 210 and a white sub-layer 220 provided underneath the thin top color layer 210. The TPO roofing membrane 200 can optionally be provided with a fabric scrim, such as a reinforcing polyester scrim 230, which can be provided underneath the one or more white sub-layers 220. The white sub-layer 220 can be made up of one or more layers. The white sub-layer can comprise one or more of titanium dioxide pigment, standard UV stabilizers, fire retardant and TPO resins. A black or a dark color can be provided as a core layer 240. The dark core layer 240 can comprise a combination of carbon black, titanium dioxide, UV stabilizers, fire retardant and/or TPO resins.

FIG. 3 is an illustration of another exemplary embodiment of a thermoplastic polyolefin roofing membrane 300 according to the present disclosure. A cap layer (i.e., a top layer) can be provided having a thin top color layer 310 and a white sub-layer 320 provided underneath the thin top color layer 310. The TPO roofing membrane 300 can optionally be provided with a reinforcing polyester scrim 330, which can be provided underneath the one or more white sub-layers 320. The white sub-layer 320 can be made up of one or more layers. The white sub-layer can comprise one or more of titanium dioxide pigment, standard UV stabilizers, fire retardant and TPO resins. A white or light cool color(s) can be provided as a core layer 340. The white core layer 340 can comprise one or more of titanium dioxide, UV stabilizers, fire retardant and TPO resins.

In the exemplary embodiments of the present disclosure, the top color TPO layer can contain one or more of weatherable cool color pigments, UV stabilizers, and fire retardants for weathering, color fastness, fire resistance and energy cost savings due to the cool colors with a high solar reflectance. The white sub-layer underneath the thin top color layer can be white with very high solar reflectance to further enhance the solar reflectance of the top color TPO layer. Different UV stabilizer packages from the top color TPO layer can be used in the white sub-layer(s).

In another exemplary embodiment of the present disclosure, a high strength white polypropylene film can be provided. The high strength white polypropylene film can be produced by, for example, a blown film process. The high strength white polypropylene film can replace any of the following components in the TPO membrane construction: the sub-white layer in the cap layer, the reinforcing polyester scrim, or any colored core layer.

In an exemplary embodiment of the present disclosure, as provided below, a higher TSR Regal Red TPO Membrane can be provided.

Example-1. Higher TSR Regal Red TPO Membrane

|  | Example -1 | Comparative Example 1 | % improvement over Comparative Example 1 |
|---|---|---|---|
| Cap Layer Construction | Top color layer: 10 mil Regal Red TPO<br>Sub-layer: 13 mil white TPO | Single color layer: 23 mil Regal Red TPO | |
| Cap Layer Compositions | Top color layer: same formulation as that of Example 2 (comparative) | Regal red color pigments, excellent | |

-continued

|  | Example -1 | Comparative Example 1 | % improvement over Comparative Example 1 |
|---|---|---|---|
|  | Sub-layer: TiO$_2$ pigment, standard UV stabilizer package, fire retardant, TPO resins | UV stabilizer package, fire retardant, TPO resins |  |
| Reinforced Scrim | Polyester | Polyester |  |
| Core Layer Construction & Compositions | 22 mil dark gray TPO Same formulation as that of Comparative Example 1 | 22 mil dark gray TPO Carbon black, TiO$_2$, fire retardant, UV stabilizer package, TPO resins |  |
| Total Solar Reflectance (TSR) per ASTM C1549 | 0.48 | 0.32 | 48% |
| Color Fastness, Delta E (after 8820 kJ/m$^2$ exposure in Xenon Arc WOM per ASTM D6878) | 1.6 | 3.6 | 56% |

In the chart above, Example 1 describes a TPO roofing membrane according to the exemplary embodiments of the present disclosure, and Comparative Example 1 provides a description of a known roofing membrane. In Example 1, a top color layer comprising 10 mil Regal Red is provided with a white sub-layer comprising 13 mil white TPO. The white sub-layer comprises titanium dioxide pigment, standard UV stabilizer package(s), fire retardant and TPO resins. The Comparative Example 1 provides a top layer having a single color layer having 23 mil Regal Red TPO. The top layer of Comparative Example 1 has a similar composition to Example 1. A similar reinforced scrim and core layer construction and composition is provided in Example 1 and Comparative Example 1. As shown in the chart, the total solar reflectance of Example 1 provided a 48% improvement compared to Comparative Example 1, and a color fastness providing a 56% improvement over Comparative Example 1.

In another exemplary embodiment of the present disclosure, as provided below, a higher TSR Goldenrod TPO Membrane can be provided.

Example-2. Higher TSR Goldenrod TPO Membrane

|  | Example-2 | Comparative Example 2 | % improvement over Comparative Example 2 |
|---|---|---|---|
| Cap Layer Construction | Top color layer: 10 mil Goldenrod TPO Sub-layer: 13 mil white TPO | Single color layer: 23 mil Goldenrod TPO |  |
| Cap Layer Compositions | Top color layer: same formulation as that of Example 2 (comparative) Sub-layer: TiO$_2$ pigment, standard UV stabilizer package, fire retardant, TPO resins | Goldenrod color pigments, excellent UV stabilizer package, fire retardant, TPO resins |  |
| Reinforced Scrim | Polyester | Polyester |  |
| Core Layer Construction & Compositions | 22 mil dark gray TPO Same formulation as that of Comparative Example 1 | 22 mil dark gray TPO Carbon black, TiO$_2$, fire retardant, UV stabilizer package, TPO resins |  |
| Total Solar Reflectance (TSR) per ASTM C1549 | 0.64 | 0.56 | 14% |
| Color Fastness, Delta E (after 6800 kJ/m$^2$ exposure in Xenon Arc WOM per ASTM D6878) | 0.7 | 4.1 | 83% |

In the chart above, Example 2 describes a TPO roofing membrane according to the exemplary embodiments of the present disclosure, and Comparative Example 2 provides a description of a known roofing membrane. In Example 2, a top color layer comprising 10 mil Goldenrod TPO is provided with a white sub-layer comprising 13 mil white TPO. The white sub-layer comprises titanium dioxide pigment, standard UV stabilizer package(s), fire retardant and TPO resins. The Comparative Example 2 provides a top layer having a single color layer having 23 mil Goldenrod TPO. The top layer of Comparative Example 2 has a similar composition to Example 2. A similar reinforced scrim and core layer construction and composition is provided in Example 2 and Comparative Example 2. As shown in the chart, the total solar reflectance of Example 2 provided a 14% improvement compared to Comparative Example 2, and a color fastness providing a 83% improvement over Comparative Example 2.

Various other considerations can also be addressed in the exemplary embodiments of the colored TPO roofing membrane of the present disclosure. For example, different configurations of layers and sub-layers can be provided to provide a high solar reflectance, including various combinations of cool colors and white layers.

Further, there are many advantages that can be provided by the exemplary embodiments according to the present disclosure. For example, with the reduced heat absorption provided by high solar reflectance cool colored roofing materials, not only are there environmental benefits, such as energy saving and reducing heat island effect, but there are also potential improvements to the longevity of roofing materials. Since heat accelerates the degradation of polymeric membranes, technology that can lower membrane temperatures can result in better retention of their physical properties. The reduced thermal expansion and contraction due to the reduced temperatures with high solar reflectance also helps to extend the life of the roofing materials.

The foregoing merely illustrates the principles of the disclosure. Various modifications and alterations to the described embodiments will be apparent to those skilled in the art in view of the teachings herein. It will thus be appreciated that those skilled in the art will be able to devise numerous layers, configurations, arrangements, manufacture and methods which, although not explicitly shown or described herein, embody the principles of the disclosure and are thus within the spirit and scope of the disclosure.

What is claimed is:

1. A multilayer membrane, comprising:
    a first layer,
        wherein the first layer comprises a UV stabilizer and a thermal stabilizer,
        wherein the first layer comprises a topmost layer;
    a second layer,
        wherein the second layer comprises a white layer, and
        wherein the second layer directly contacts the first layer;
    a third layer,
        wherein the third layer contacts the second layer; and
    a fourth layer,
        wherein the fourth layer contacts the third layer.

2. The multilayer membrane of claim 1, wherein the second layer further comprises a thermal stabilizer.

3. The multilayer membrane of claim 1, wherein the third layer further comprises a scrim layer.

4. The multilayer membrane of claim 3, wherein the scrim layer comprises a glass scrim.

5. The multilayer membrane of claim 3, wherein the scrim layer comprises a fabric scrim.

6. The multilayer membrane of claim 1, wherein the white layer comprises one or more of titanium dioxide pigment, a UV stabilizer package, and fire retardant.

7. The multilayer membrane of claim 1, wherein the fourth layer comprises a dark color.

8. The multilayer membrane of claim 1, wherein the fourth layer comprises carbon black, titanium dioxide, a UV stabilizer package, fire retardant, and TPO resins.

9. The multilayer membrane of claim 1, wherein the fourth layer comprises a light color.

10. The multilayer membrane of claim 1,
    wherein the second layer directly contacts the first layer,
    wherein the third layer directly contacts the second layer, and
    wherein the fourth layer directly contacts the third layer.

11. The multilayer membrane of claim 10, wherein the second layer comprises a scrim layer.

12. The multilayer membrane of claim 11, wherein the scrim layer comprises a glass scrim.

13. The multilayer membrane of claim 11, wherein the scrim layer comprises a fabric scrim.

14. The multilayer membrane of claim 1, wherein the second layer further comprises a thermal stabilizer,
    wherein the third layer further comprises a scrim layer.

15. The multilayer membrane of claim 14, wherein the scrim layer comprises at least one of a glass scrim or a fabric scrim.

16. The multilayer membrane of claim 14, wherein the white layer comprises one or more of titanium dioxide pigment, a UV stabilizer package, and fire retardant.

17. The multilayer membrane of claim 16, wherein the scrim layer comprises at least one of a glass scrim or a fabric scrim.

18. The multilayer membrane of claim 14,
    wherein the second layer directly contacts the first layer,
    wherein the third layer directly contacts the second layer,
    wherein the fourth layer directly contacts the third layer.

19. The multilayer membrane of claim 18, wherein the white layer comprises one or more of titanium dioxide pigment, a UV stabilizer package, and fire retardant.

20. The multilayer membrane of claim 14, wherein the white layer comprises one or more of titanium dioxide pigment, a UV stabilizer package, and fire retardant.

* * * * *